3,124,474
HEAT-SENSITIVE WATER SOLUBLE CELLULOSE ETHER COMPOSITIONS
Garth H. Beaver and Donald E. Cobb, both of Midland, Mich., assignors to The Dow Chemical Company, Midland, Mich., a corporation of Delaware
No Drawing. Filed Dec. 13, 1961, Ser. No. 159,143
13 Claims. (Cl. 106—189)

The present invention relates to novel heat-sealable adhesive compositions. Particularly, the invention concerns mixtures of water-soluble, thermoplastic, mixed alkyl-hydroxyalkyl cellulose ethers and certain aliphatic triols as hereinafter specified.

In today's packaging industry, there are needs for a wide variety of adhesives. Among these are adhesives which achieve a tack or bond under the influence of heat and which, upon moistening, are deactivated. Such heat-sealing, remoistenable adhesives are highly efficacious in label fastening, bag sealing and similar operations wherein rapid bonding and subsequent ease of removal or reopening are important characteristics.

It is an object of the present invention to provide novel heat-sealable and remoistenable adhesives and particularly heat-sealable adhesives which are activated at low temperatures. In addition, it is desirable to provide heat-sealable compositions that can be used in the form of an aqueous dispersion, lacquer or extruded article. A further object is to provide an adhesive composition which can be utilized in the form of a hot-melt adhesive.

The above objects and others, as will become apparent hereinafter, are accomplished in accordance with the present invention with a heat-sensitive adhesive composition comprising a mixture of a water-soluble, thermoplastic, mixed methyl-hydroxyalkyl cellulose ether wherein the alkyl group contains 3 or 4 carbon atoms and an aliphatic triol plasticizer characterized according to the formula:

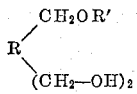

wherein R is a trivalent hydrocarbon radical having from 2 to 5 carbon atoms and R' is selected from the group consisting of hydrogen and hydroxyalkyls having from 2 to 4 carbons.

While it is generally preferred to use the aforementioned composition without further additions, optional additaments include inert extenders such as finely divided clays, diatomaceous earths and the like. Sometimes it may be desirable to include auxiliary plsticizers such as tri-(hydroxypropyl)glycerol, propylene glycol, low molecular weight polyethylene glycols, low molecular weight polypropylene glycols, glycerol monoacetate, glycerol diacetate, 1,3-butylene glycol, tetrakis hydroxypropyl ethylenediamine and the like.

In the practice of the invention, from about 0.5 to about 3 parts of the triol plasticizer are employed for each part of the cellulose ether present. It is preferred, for optimum results, however, to operate within the range from about 0.7 to 1.5 parts of the plasticizer for each part of the cellulose ether. When they are included, it is desirable to employ no more than about 0.3 part of an extender for each part of the cellulose ether and no more than about 35 weight percent of an auxiliary plasticizer based on the weight of the aforementioned triol plasticizer of the invention.

The heat-sensitive adhesive composition of the present invention can be utilized in the form of an aqueous dispersion, lacquer, extruded film or hot-melt adhesive. When utilizing the composition in the form of a solution or lacquer, from about 0.05 up to 1 part of the cellulose ether-triol plasticizer mixture is dissolved in 1 part of a solvent system. Suitable solvent systems include water and organo-water solvents such as methanol/water or methanol/benzene/water and the like mixtures of water and organic solvents miscible therewith, individually or in combination. Other suitable solvents are organic solvents such as ethylene glycol, diethylene glycol, benzaldehyde, formamide, dimethylformamide, benzyl alcohol, furfuryl alcohol, tetrahydrofurfuryl alcohol, methyl lactate, ethyl lactate, 2,4-pentanediol and the like organic solvents for the cellulose ethers.

The adhesive composition of the invention is especially efficacious as a bonding composition for such substrates as paper, fiberboard, veneer, leather and most plastic films such as polypropylene, polyethylene and saran. Such substrates, or adherends, can be bonded to each other or to any desired glass, ceramic, metal or the like support.

Upon application of the adhesive solution or lacquer to a particular adherend to be bonded, the solvent or dispersing medium is evaporated thereby leaving a residual non-tacky, thermoplastic, adhesive film. Adhesive bonding or tacking is accomplished by subjecting a composite sandwich of the adherends and intermediate layer of the thermoplastic adhesive to an effective sealing temperature under an adequate pressure to ensure efficient contacting of the adherends with the adhesive layer. Good adhesion is accomplished at temperatures of about 120° C. for a period of one second or less. Optimum adhesion qualities are achieved with the employment of a temperature of about 130° C. up to about 180° C. While higher temperatures up to as much as 200° C. or more can be employed, no additional benefit is realized. The pressures utilized may vary from as little as virtually no pressure at all, as when the adhesive is employed in the form of a hot-melt, to substantial pressures of as much as 500 pounds per square inch or more. The higher pressures must, of course, be within the limits of pressure the adherend is capable of sustaining without degradative deformation. As will be apparent to those skilled in the art, heat and pressures applied to the adhesive-coated adherends may vary for optimum results according to the thicknesses and nature of the adherends, the heat transfer efficiencies realized and the like considerations normally present in the utilization of heat-sealing adhesives.

In addition to the foregoing modes of application, it is possible to apply the heat-sealable adhesive compositions of the invention in the form of an extruded strip, film, rope or the like extruded article which may be sandwiched between two adjacent adherends to be bound and thereafter activated upon the application of heat thereto. The heat-sealing conditions utilized are the same as described above.

In still another mode of operation, the adhesive composition of the invention is utilized in the form of a hot-melt, that is, a mixture of the cellulose ether and triol is heated to above its melting point and applied as a thin film to adherends in liquid form. Upon cooling of such adhesive between adherends to be joined, an excellent bond is achieved.

Any adhesive bond prepared in accordance with the present invention, i.e., by any of the foregoing modes of operation, can be deactivated by subsequently wetting the adhesive with water whereupon it is solubilized permitting easy separation of the adherends.

The cellulose ethers to be employed in the present invention include the water-soluble, thermoplastic, mixed methyl-hydroxyalkyl cellulose ethers wherein the alkyl group contains from 3 to 4 carbons. Such ethers can be characterized by a viscosity range for 2 percent solutions thereof in water at 20° C. of from about 10 to about 5,000 centipoises. Specific ethers include methyl-hydroxypropyl cellulose ether having a methoxyl degree of substitution (D.S.) from about 1.4 up to about 1.8 and a hydroxypropoxyl degree of substitution (D.S.) from about 0.07 up to about 0.3. Methyl-hydroxybutyl cellulose ethers operable in the invention are characterized by a methoxyl D.S. from about 1.6 up to about 1.8 and a hydroxybutoxyl D.S. from about 0.05 up to about 0.2. "Degree of substitution," as employed in the foregoing, refers to the average number of the particular substituent per each reoccurring anhydroglucose moiety of the cellulose.

The unique class of plasticizers of the invention includes such compounds as 1,1,1-trimethylolpropane, 1,1,1-trimethylolethane, 3-hydroxymethyl-1,5-pentanediol, 2-(2-hydroxyethoxymethyl)-2, 4-dimethyl-1,5-pentanediol and mono(hydroxyalkyl) ethers of the foregoing wherein the alkyl has from 2 to 4 carbons.

To illustrate the invention, a series of plasticized cellulose ether adhesive compositions were prepared consisting of 1 part of a triol plasticizer of the invention and 1 part of a methyl-hydroxypropyl cellulose ether having a methoxyl degre of substitution in the range from about 1.68 to about 1.82 and a hydroxypropoxyl degree of substitution within the range from about 0.17 to about 0.23. In other compositions made for the purpose of comparison, the plasticizers used included some of those heretofore employed with cellulose ethers. The latter plasticizers, as will be indicated in the data tabulated below, were unsatisfactory. The aforementioned adhesive components were dispersed in a solvent system consisting of 60 percent methanol, 25 percent benzene and 15 percent water. Enough of the active adhesive components were used to provide a solution of about 20 percent by weight solids. Thereafter, coatings of the dissolved adhesive system were applied to one surface of label paper having a 65 pound basis weight. After drying at 75° F. and a relative humidity of 50 percent for 18 hours, the residual coating was 2 mils thick. An additional sheet of Brokaw paper, 80 pound basis weight, was laid over the adhesive-coated sheet and the resulting composite was placed in a heated press wherein it was subjected to a pressure of 330 pounds per square inch for one second at a temperature of about 120° C. A number of other composites were similarly constructed and cured at temperatures of 130°, 140°, 150°, 160°, 170°, 180°, 190° and 200° C., respectively.

After sealing and conditioning for 18 hours at 100° F. at 95 percent relative humidity, the papers thus bonded were separated. The area of effective bonding, reported as a percentage of the total area having applied adhesive, was determined by visual inspection of the 80 pound basis weight Brokaw paper.

The particular plasticizer employed (those of the prior art are being included for the purposes of comparison), the temperature employed in the sealing operation and the percentage of bonded surface based on the total adhesive-coated surface are set forth in the following table.

Table.—Adhesive Bond Quality

| Plasticizer Used | Percent Adhesive Bond at Sealer Jaw Temperatures (° C.) | | | | | | | | |
|---|---|---|---|---|---|---|---|---|---|
| | 120° | 130° | 140° | 150° | 160° | 170° | 180° | 190° | 200° |
| Trimethylolpropane (TMP) | 40 | 100 | 100 | 100 | 100 | 100 | 100 | No trial | No trial |
| Trimethylolethane | 20 | 90 | 100 | 100 | 100 | 100 | 100 | No trial | No trial |
| Monohydroxypropyl TMP | | | 30 | 30 | 80 | 100 | 100 | 100 | 100 |
| Monohydroxyethyl TMP | | | 60 | 80 | 80 | 100 | 100 | No trial | |
| 2-(2-Hydroxyethoxymethyl)-2,4-dimethyl-1,5-pentanediol | | | | 80 | 80 | 80 | 100 | 100 | 100 |
| ⅓ 1-3 Butylene glycol ⅔ Triethyl phosphate | No adhesive bond | | | | | | | | |
| Methyl carbitol | No adhesive bond | | | | | | | | |
| Tetrahydroxypropylethylenediamine | No adhesive bond | | | | | | | | |
| Propylene glycol | No adhesive bond | | | | | | | | |
| Diethyleneglycol diacetate | No adhesive bond | | | | | | | | |
| 2,4-Pentanediol | No adhesive bond | | | | | | | | |

What is claimed is:

1. A composition of matter comprising a water-soluble, thermoplastic, mixed methyl-hydroxyalkyl cellulose ether selected from the group consisting of methyl-hydroxypropyl cellulose ether having a methoxyl degree of substitution from about 1.4 up to about 1.8 and a hydroxypropoxyl degree of substitution from about 0.07 up to about 0.3 and methyl-hydroxybutyl cellulose ether having a methoxyl degree of substitution from about 1.6 up to about 1.8 and a hydroxybutoxyl degree of substitution from about 0.05 up to about 0.2 and a triol plasticizer characterized according to the formula:

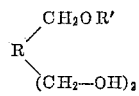

wherein R is a trivalent hydrocarbon radical having from 2 to 5 carbon atoms and R' is selected from the group consisting of hydrogen and hydroxyalkyls having from 2 to 4 carbons, said composition containing from about 0.5 to about 3 parts of the triol plasticizer for each part of the cellulose ether.

2. A composition as in claim 1 wherein the triol is 1,1,1-trimethylolpropane.

3. A composition as in claim 1 wherein the triol is 1,1,1-trimethylolethane.

4. A composition as in claim 1 wherein the triol is a mono(hydroxyethyl) ether of 1,1,1-trimethylolpropane.

5. A composition as in claim 1 wherein the triol is a mono(hydroxypropyl) ether of 1,1,1-trimethylolpropane.

6. A thin, extruded article of the composition of claim 1.

7. The process which comprises the steps of heating the composition of claim 1 above its melting point, applying the resulting melt to a facing surface of an adherend and immediately thereafter, while the adhesive composition is still fluid, placing the coated adherend in contact with a second adherend.

8. The process which comprises the steps of heating the composition of claim 1 above its melting point, applying the resulting melt to a facing surface of an adherend, cooling the adhesive composition and subsequently, placing the coated adherend in contact with a second adherend with the simultaneous application thereto of sufficient heat and pressure to accomplish bonding of the adherends.

9. A composition of matter comprising a water-soluble, thermoplastic, mixed methyl-hydroxyalkyl cellulose ether selected from the group consisting of methyl-hydroxypropyl cellulose ether having a methoxyl degree of substitution from about 1.4 up to about 1.8 and a hydroxypropoxyl degree of substitution from about 0.07 up to about 0.3 and methyl-hydroxybutyl cellulose ether having a methoxyl degree of substitution from about 1.6 up to about 1.8 and a hydroxybutoxyl degree of substitution from about 0.05 up to about 0.2; a triol plasticizer characterized according to the formula:

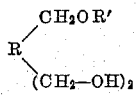

wherein R is a trivalent hydrocarbon radical having from 2 to 5 carbon atoms and R' is selected from the group consisting of hydrogen and hydroxyalkyls having from 2 to 4 carbons; and a solvent system selected from the class consisting of water, organo-water systems wherein the organic phase is miscible with water and organic solvents for the cellulose ethers, said composition containing from about 0.5 to about 3 parts of the triol plasticizer for each part of the cellulose ether and from about 0.05 to about 1 part of the cellulose ether-triol plasticizer mixture for each part of the solvent system.

10. A composition as in claim 9 wherein the solvent system is water.

11. A composition as in claim 9 wherein the solvent system consists of a major proportion of a mixture of methanol and benzene and a minor proportion of water.

12. A composition of matter comprising a water-soluble, thermoplastic mixed methyl-hydroxypropyl cellulose ether having a methoxyl degree of substitution from about 1.4 up to about 1.8 and a hydroxypropoxyl degree of substitution from about 0.07 up to about 0.3 and a triol plasticizer characterized according to the formula:

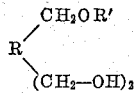

wherein R is a trivalent hydrocarbon radical having from 2 to 5 carbon atoms and R' is selected from the group consisting of hydrogen and hydroxyalkyls having from 2 to 4 carbons, said composition containing from about 0.5 to about 3 parts of the triol plasticizer for each part of the cellulose ether.

13. A composition of matter comprising a water-soluble, thermoplastic mixed methyl-hydroxybutyl cellulose ether having a methoxyl degree of substitution from about 1.6 up to about 1.8 and a hydroxybutoxyl degree of substitution from about 0.05 up to about 0.2 and a triol plasticizer characterized according to the formula:

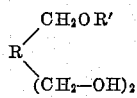

wherein R is a trivalent hydrocarbon radical having from 2 to 5 carbon atoms and R' is selected from the group consisting of hydrogen and hydroxyalkyls having from 2 to 4 carbons, said composition containing from about 0.5 to about 3 parts of the triol plasticizer for each part of the cellulose ether.

References Cited in the file of this patent
UNITED STATES PATENTS

| | | |
|---|---|---|
| Re. 22,301 | Pitman | Apr. 13, 1943 |
| 2,443,409 | Whitner | June 15, 1948 |
| 2,958,607 | Windover et al. | Nov. 1, 1960 |
| 2,965,508 | Windover et al. | Dec. 20, 1960 |